UNITED STATES PATENT OFFICE.

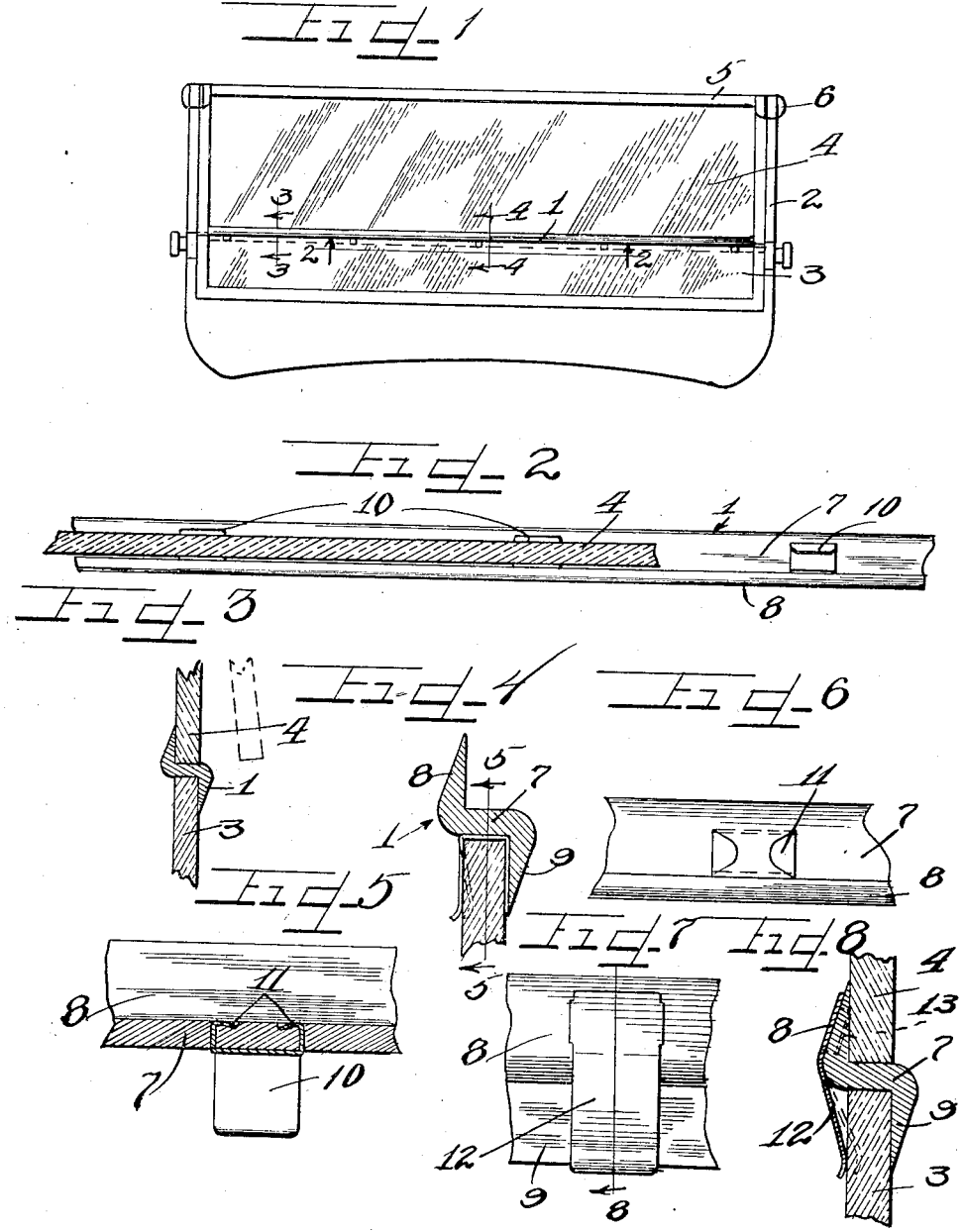

GEORGE C. REEVES, OF CHICAGO, ILLINOIS, ASSIGNOR TO DRYDEN RUBBER COMPANY, A CORPORATION OF ILLINOIS.

WEATHER-STRIP.

1,350,883.  Specification of Letters Patent.  Patented Aug. 24, 1920.

Application filed March 28, 1919. Serial No. 285,721.

*To all whom it may concern:*

Be it known that I, GEORGE C. REEVES, a citizen of the United States and a resident of the city of Chicago, in the county of Cook and State of Illinois, have invented certain new and useful Improvements in Weather-Strips; and I do hereby declare that the following is a full, clear, and exact description of the same, reference being had to the accompanying drawings, and to the numerals of reference marked thereon, which form a part of this specification.

This invention relates to weather strips and although not limited to such use is particularly adapted for use in connection with automobile wind shields.

One of the principal objects of the invention is to provide a weather strip which will prevent wind or water passing through the space between the two halves of a wind shield when in closed position.

A further object of the invention is to provide a weather strip which may be applied to the wind shield of automobiles without any alterations in the construction thereof.

Other and further important objects of this invention will be apparent from the disclosures in the specification and drawings.

The invention (in a preferred form) is illustrated in the drawings and hereinafter more fully described.

In the drawings:

Figure 1 is a rear elevation of an automobile wind shield with a weather strip applied thereto embodying the invention.

Fig. 2 is a section on the line 2—2 of Fig. 1.

Fig. 3 is a section on the line 3—3 of Fig. 1.

Fig. 4 is a section on the line 4—4 of Fig. 1.

Fig. 5 is a section on the line 5—5 of Fig. 4.

Fig. 6 is a plan view of a portion of the weather strip.

Fig. 7 is a rear elevation of a portion of a modified form of weather strip.

Fig. 8 is a section on the line 8—8 of Fig. 7.

As shown in the drawings:

The weather strip 1, is shown attached to the wind shield 2, of common construction comprising a lower glass strip 3 and an upper glass strip 4. The upper glass strip 4 is mounted in the standards of the wind shield.

The weather strip is of Z-shaped cross-section so that the central portion 7 may be secured to the edge of one of the glass strips 3 or 4, preferably the former. The upstanding flange 8 of the weather strip is arranged on the inner side of the wind shield while the depending flange 9 is arranged on the opposite side of the shield. The flange 8 prevents water passing over the weather strip while the flange 9 prevents water passing under the weather strip.

The weather strip is preferably formed of resilient water proof material such as rubber. Suitable means are provided for holding the weather strip in place such as clips 10. These clips which may be conveniently formed of sheet metal are adapted to grip the edge of one of the glass strips 3 or 4 as shown more particularly in Fig. 4. At the sides of the central portions of these clip extensions 11 are provided which are bent vertically upward for passage through corresponding apertures in the central portion 7 of the weather strip. After the extensions 11 have been passed through these apertures the projecting ends are turned over or clenched to secure the clip firmly to the weather strip.

In Figs. 7 and 8, a modified form of attaching means is shown. In this case a clip 12 is provided secured to the upper flange 8 of the weather strip and bearing at its lower end against the inner face of the glass strip 3. Lateral extensions 13 on the clips 12 are passed through the flange 8 and clenched the other side to clamp the clips to the weather strip.

The edge of the glass strip 3 is gripped between the lower part of the clip 12 and the lower flange 9, of the weather strip.

I am aware that the details of construction may be varied through a wide range without departing from the principles of this invention and I therefore, do not purpose limiting the patent granted otherwise than necessitated by the prior art.

I claim as my invention:

A weather strip for automobile wind shields, comprising a Z-shaped strip of impervious resilient material, and a spring clip permanently attached thereto, said strip and clip adapted detachably to engage the opposite edges of one portion of the wind shield.

In testimony whereof I have hereunto subscribed my name in the presence of two subscribing witnesses.

GEORGE C. REEVES.

Witnesses:
 EARL M. HARDINE,
 CHARLES W. HILLS, Jr.